(12) United States Patent
Lee et al.

(10) Patent No.: US 11,588,641 B2
(45) Date of Patent: Feb. 21, 2023

(54) ELECTRONIC APPARATUS AND CONTROLLING METHOD THEREOF

(71) Applicant: Samsung Electronics Co., Ltd., Suwon-si (KR)

(72) Inventors: Dongsun Lee, Suwon-si (KR); Changhan Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 177 days.

(21) Appl. No.: 17/249,459

(22) Filed: Mar. 2, 2021

(65) Prior Publication Data

US 2022/0123938 A1    Apr. 21, 2022

(30) Foreign Application Priority Data

Oct. 20, 2020    (KR) .................. 10-2020-0135827

(51) Int. Cl.
*H04L 9/32* (2006.01)
*G06F 9/455* (2018.01)
*H04L 9/40* (2022.01)

(52) U.S. Cl.
CPC ........ *H04L 9/3226* (2013.01); *G06F 9/45558* (2013.01); *H04L 63/0435* (2013.01); *H04L 63/0442* (2013.01); *G06F 2009/45587* (2013.01)

(58) Field of Classification Search
CPC ............... H04L 9/3226; H04L 63/0435; H04L 63/0442; G06F 9/45558
See application file for complete search history.

(56) References Cited

U.S. PATENT DOCUMENTS

| 8,086,852 | B2 | 12/2011 | Bade et al. |
| 8,340,299 | B2 | 12/2012 | Buer et al. |
| 8,375,221 | B1 | 2/2013 | Thom et al. |

(Continued)

FOREIGN PATENT DOCUMENTS

| KR | 10-1974188 B1 | 4/2019 |
| KR | 10-2020-0032945 A | 3/2020 |

(Continued)

OTHER PUBLICATIONS

Berger, et al., "vTPM: Virtualizing the Trusted Platform Module," USENIX-SS'06, Proceedings of the 15th conference on USENIX Security Symposium, vol. 15, Jul. 2006, 16 pages.

(Continued)

*Primary Examiner* — Shanto Abedin

(57) ABSTRACT

An electronic apparatus includes a communication interface, a memory; and a processor. The memory is configured to store a hypervisor. The processor is configured to obtain an authentication key for performing authentication of an external device. The processor is also configured to encrypt the authentication key based on a key pre-stored in the memory using the hypervisor and store the encrypted authentication key in the memory. Based on a request for information that is stored in the memory being received from the external device, the processor is configured to perform authentication of the external device using the hypervisor. Based on the authentication of the external device being completed, the processor is configured to control the communication interface to transmit the stored information to the external device.

21 Claims, 7 Drawing Sheets

(56) References Cited

U.S. PATENT DOCUMENTS

| | | | |
|---|---|---|---|
| 8,977,842 B1 | 3/2015 | McCorkendale et al. | |
| 9,189,653 B2 | 11/2015 | Thom et al. | |
| 2005/0283826 A1 | 12/2005 | Tahan | |
| 2006/0280297 A1 | 12/2006 | Fukaya | |
| 2010/0281273 A1* | 11/2010 | Lee | F04B 33/00 |
| | | | 713/193 |
| 2014/0208097 A1* | 7/2014 | Brandwine | G06F 21/33 |
| | | | 713/164 |
| 2018/0152454 A1 | 5/2018 | Kwon et al. | |
| 2018/0196945 A1 | 7/2018 | Kornegay et al. | |
| 2019/0042759 A1 | 2/2019 | Smith et al. | |
| 2020/0092328 A1 | 3/2020 | Kim et al. | |

FOREIGN PATENT DOCUMENTS

| | | |
|---|---|---|
| KR | 10-2020-0036732 A | 4/2020 |
| WO | 2013019369 A1 | 2/2013 |

OTHER PUBLICATIONS

International Search Report dated Jul. 15, 2021 in connection with International Patent Application No. PCT/KR2021/002372, 3 pages.
Written Opinion of the International Searching Authority dated Jul. 15, 2021 in connection with International Patent Application No. PCT/KR2021/002372, 3 pages.

* cited by examiner

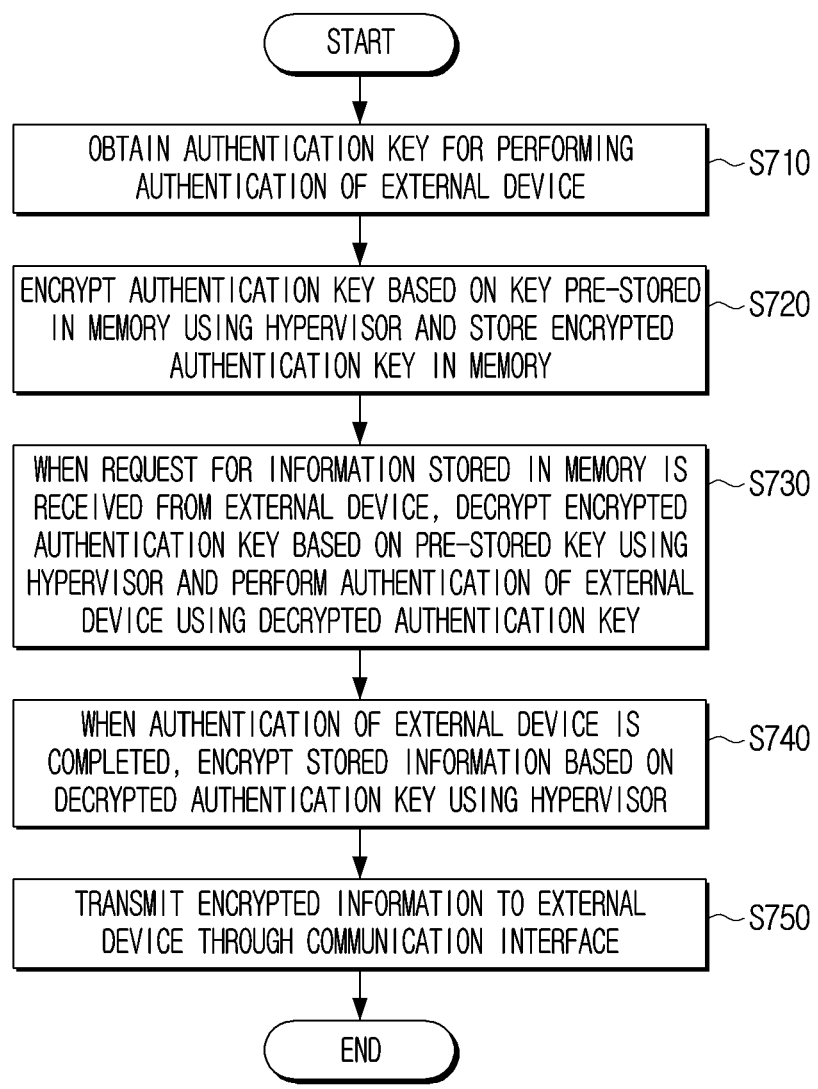

ELECTRONIC APPARATUS AND CONTROLLING METHOD THEREOF

CROSS-REFERENCE TO RELATED APPLICATION

This application is based on and claims priority under 35 U.S.C. 119 to Korean Patent Application No. 10-2020-0135827, filed on Oct. 20, 2020, in the Korean Intellectual Property Office, the disclosure of which is incorporated herein by reference in its entirety.

BACKGROUND

1. Field

Aspects of the exemplary embodiments relate to an electronic apparatus and a controlling method thereof and more particularly, to an electronic apparatus that manages an authentication key using a hypervisor and a controlling method thereof.

2. Description of the Related Art

A Trusted Platform Module (TPM) is a module that can be used to store security information such as encryption keys. In particular, the TPM is used to provide a root of trust in security systems of various electronic apparatuses including mobile devices.

Meanwhile, the conventional TPM is implemented in a hardware form such as a smart card or dedicated security hardware and mounted on an electronic apparatus. When a hardware-based TPM is added to an electronic apparatus, the manufacturing cost of the electronic apparatus increases. Therefore, there is a problem that the TPM is difficult to be adopted in products such as low-spec devices.

Accordingly, there is a need for a technology for a TPM applicable to low-spec devices.

SUMMARY

An aspect of the present disclosure is to provide a hypervisor-based TPM.

Aspects of the present disclosure are not limited to the technical tasks mentioned above, and other technical tasks that are not mentioned will be clearly understood by those skilled in the art from the following description.

An electronic apparatus according to an embodiment includes a communication interface, a memory configured to store a hypervisor and a processor, and the processor is configured to obtain an authentication key for performing authentication of an external device, encrypt the authentication key based on a key pre-stored in the memory using the hypervisor and store the encrypted authentication key in the memory, based on a request for information stored in the memory being received from the external device, perform authentication of the external device using the hypervisor, and based on the authentication of the external device being completed, control the communication interface to transmit the stored information to the external device.

The processor may decrypt the encrypted authentication key based on the pre-stored key using the hypervisor, and perform authentication of the external device using the decrypted authentication key.

The processor may perform decryption of the message using the hypervisor based on a message including the request being obtained, and determine whether the external device is a pre-registered device based on a result of the decryption.

The processor may determine that the external device is the pre-registered device based on the message being successfully decrypted and determine that the external device is not the pre-registered device based on the message not being successfully decrypted.

The processor may encrypt the stored information based on the decrypted authentication key using the hypervisor and control the communication interface to transmit the encrypted information to the external device based on the authentication of the external device being completed.

The authentication key may include a private key and a public key that correspond to each other, and decrypt the encrypted message based on the public key using the hypervisor based on a message encrypted by the external device based on the private key being received.

The information stored in the memory may include location information of an IoT device related to the electronic apparatus.

A controlling method of an electronic apparatus according to an embodiment includes obtaining an authentication key for performing authentication of an external device, encrypting the authentication key based on a key pre-stored in the memory using the hypervisor and store the encrypted authentication key, based on a request for information stored in the memory being received from the external device, performing authentication of the external device using the hypervisor, and based on the authentication of the external device being completed, transmitting the stored information to the external device.

Aspects of the present disclosure are not limited to the technical tasks mentioned above, and other technical tasks that are not mentioned will be clearly understood by those skilled in the art from the following description and accompanying drawings.

According to various embodiments of the present disclosure, an electronic apparatus may provide a root of trust to users using a hypervisor-based TPM. Accordingly, a manufacturing cost may be reduced compared to an electronic apparatus to which a conventional hardware-based TPM is applied.

Other effects that can be obtained or appreciated by the embodiments of the present disclosure will be disclosed directly or implicitly in the detailed description of the embodiments of the present disclosure. For example, various embodiments of the present disclosure will be disclosed in the detailed description that will be explained later.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7 illustrates a flowchart of a controlling method of an electronic apparatus.

DETAILED DESCRIPTION

Figure 1:
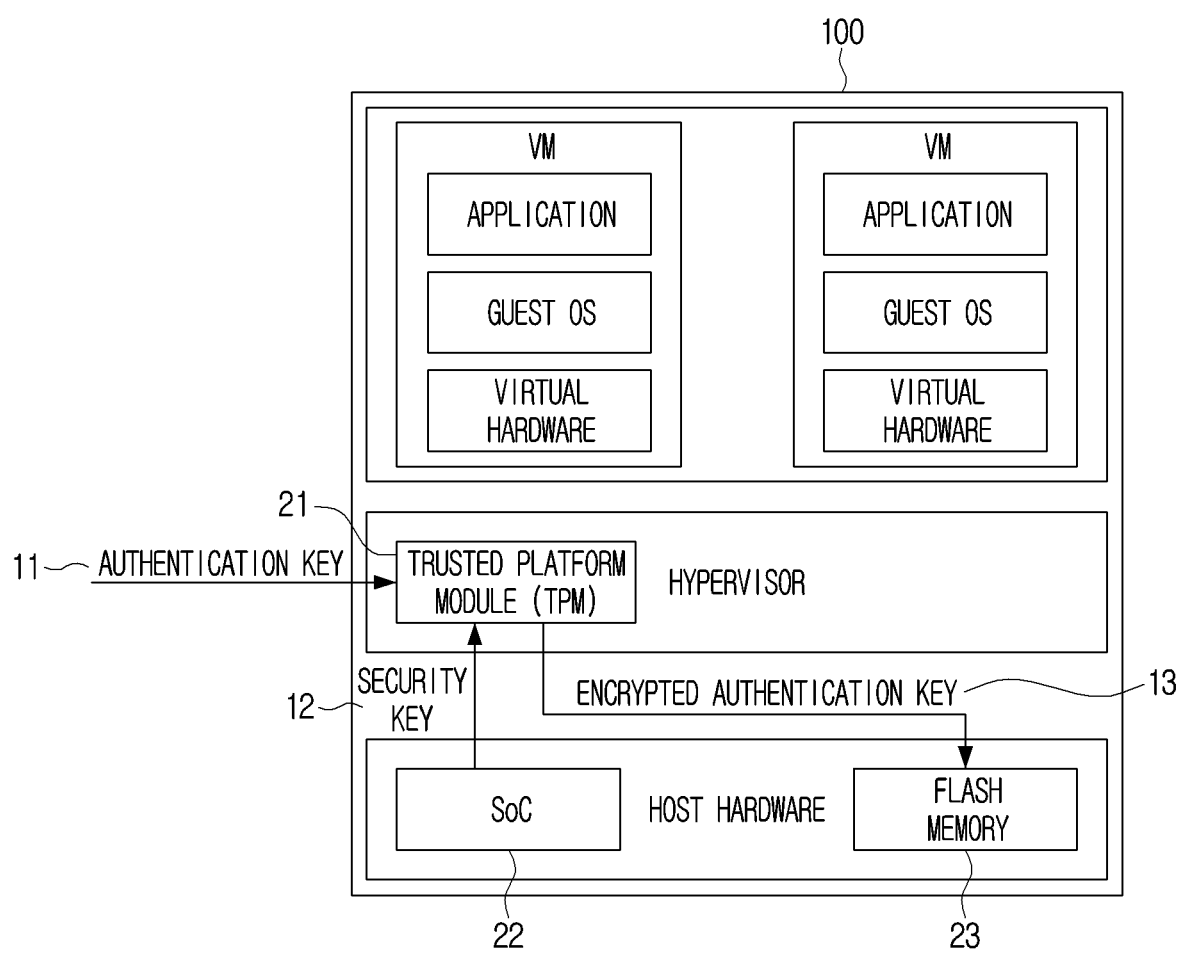
FIG. 1 illustrates a view provided to explain a concept of an electronic apparatus according to an embodiment.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

After terms used in the specification are briefly described, the disclosure will be described in detail.

General terms that are currently widely used were selected as terms used in embodiments of the disclosure in consideration of functions in the disclosure, but may be changed depending on the intention of those skilled in the art or a judicial precedent, an emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in the disclosure should be defined on the basis of the meaning of the terms and the contents throughout the disclosure rather than simple names of the terms.

Embodiments of the disclosure may apply various modifications and have various embodiments, and specific embodiments will be illustrated in the drawings and described in detail in the detail description. However, this is not intended to limit the scope to the specific embodiment, and it should be understood to include all modifications, equivalents, and substitutes included in the scope of the disclosed spirit and technology. In describing the embodiments, when it is determined that the detailed description of the related known technology may obscure the gist, the detailed description thereof will be omitted.

Terms 'first', 'second', and the like, may be used to describe various components, but the components are not to be construed as being limited by the terms. The terms are used to distinguish one component from other components.

Singular expressions include plural expressions unless the context clearly indicates otherwise. It should be further understood that terms "include" or "constitute" used in the application specify the presence of features, numerals, steps, operations, components, parts, or combinations thereof mentioned in the specification, but do not preclude the presence or addition of one or more other features, numerals, steps, operations, components, parts, or combinations thereof Hereinafter, embodiments of the disclosure will be described in detail with reference to the accompanying drawings so that those skilled in the art to which the disclosure pertains may easily practice the disclosure. However, the disclosure may be implemented in various different forms and is not limited to the embodiments described herein. In addition, in the drawings, portions unrelated to the description will be omitted, and similar portions will be denoted by similar reference numerals throughout the specification.

FIG. 1 illustrates a view provided to explain a concept of an electronic apparatus according to an embodiment.

FIG. 1 is a view provided to explain a concept of an electronic apparatus according to an embodiment. An electronic apparatus 100 may include a hypervisor-based TPM 21, a System on Chip (SoC) 22, a flash memory 23, and a Virtual Machine (VM). The VM refers to a virtual space in which a computing environment is implemented as software, and an application and a guest operating system are installed on the VM. The VM may include an application to be executed based on a resource that is controlled or provided under the control of the guest operating system and a library used for execution of the application. The hypervisor is placed on top of a host operating system and refers to software that controls resources provided to the VM so that the guest operating system which is a separate operating system on the VM can be executed.

The hypervisor-based TPM 21 may manage an authentication key at a hypervisor level. For example, the TPM 21 may encrypt an authentication key 11 using a security key 12 stored in the SoC 22, and store an encrypted authentication key 13 in the flash memory 23. Here, the authentication key 11 is a key for performing authentication of an external device or encrypting information stored in the electronic apparatus 100. The authentication key 11 may be a symmetric key or a non-symmetric key. The electronic apparatus 100 may generate the authentication key 11 to share the authentication key 11 with an external device, or may receive the authentication key 11 generated by an external device. Meanwhile, the security key 12 refers to a unique key which is determined at the step of manufacturing the electronic apparatus 100 or the SoC 22. Accordingly, the security key 12 is stored in the SoC 22 which is host hardware and thus, the VM cannot access the pre-stored key.

The TPM 21 obtains the authentication key 11 and performs authentication at the hypervisor level and thus, the VM cannot access the authentication key 11. In addition, the TPM 21 stores the encrypted authentication key 13 in the flash memory 23 which is host hardware and thus, the VM cannot access the encrypted authentication key 13. Accordingly, even if the VM is exposed to an external attacker, the attacker cannot access the flash memory 23 and thus, cannot obtain the encrypted authentication key 13. Even if the VM obtains the encrypted authentication key 13, the VM cannot decrypt the encrypted authentication key and thus, the authentication key can be managed safely.

As such, the TPM 21 operates at the hypervisor level or in the hypervisor mode to provide a root of trust. In addition, the TPM 21 does not use separate hardware as it is implemented by hypervisor-based software and thus, a manufacturing cost is lower than that of the conventional hardware-based TPM. Accordingly, the TPM 21 may be applied to low-cost devices. Hereinafter, each configuration of the electronic apparatus 100 will be described in detail.

Figure 2:
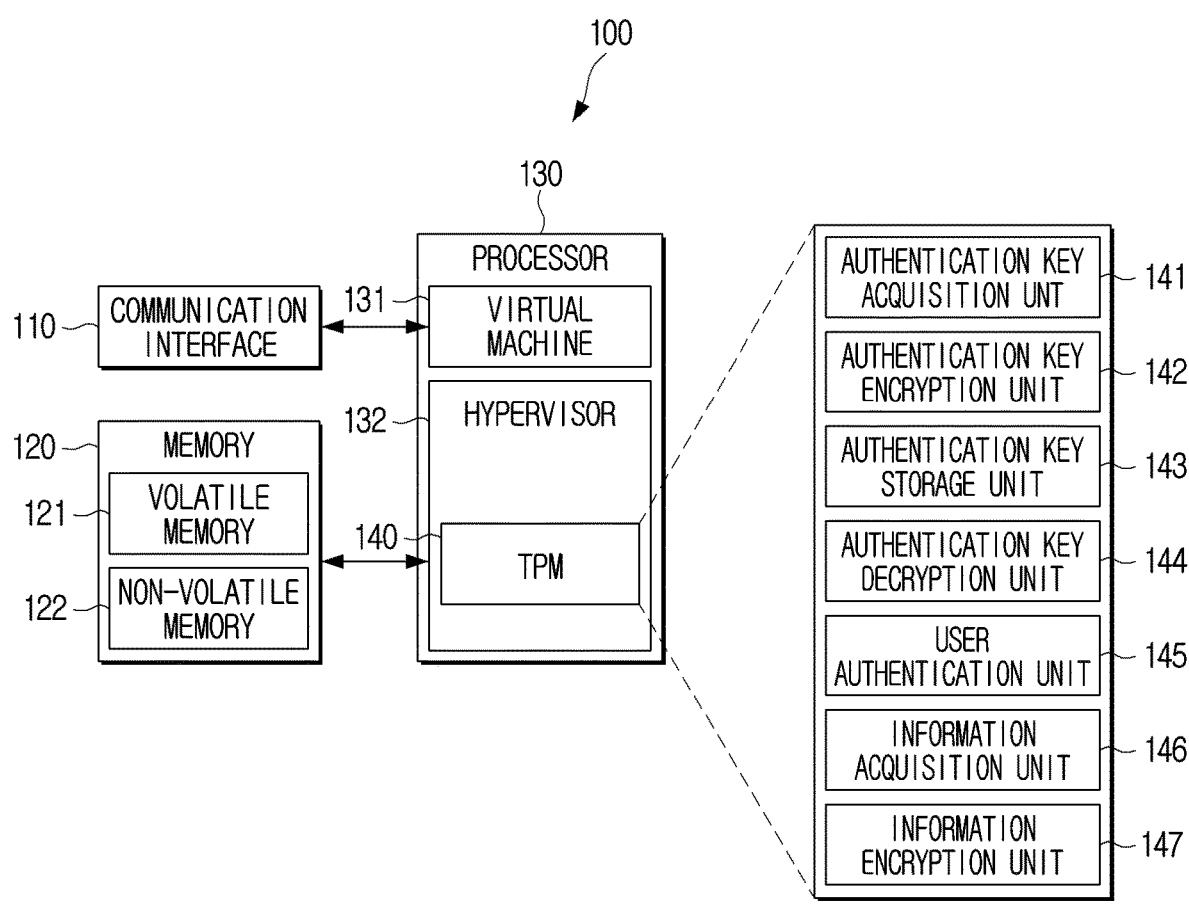
FIG. 2 illustrates a block diagram of configuration of an electronic apparatus according to an embodiment.

FIG. 2 illustrates a block diagram of configuration of an electronic apparatus according to an embodiment. The electronic apparatus 100 may include a communication interface 110, a memory 120 and a processor 130. For example, the electronic apparatus 100 may be a tracker device for obtaining a location of an IoT device. Alternatively, the electronic apparatus 100 may be implemented as an IoT device such as a camera, a smart boiler, a smart refrigerator, and a smart lighting.

The communication interface 110 includes at least one circuit and may perform communication with various types of external devices according to various types of communication methods. For example, the communication interface 110 may receive an authentication key for performing authentication of an external device from the external device. In addition, the communication interface 110 may receive a request for information stored in the memory 120 from an external device.

The memory 120 may store instructions for controlling the overall operations of the components of the electronic apparatus 100 and commands or data related to the components of the electronic apparatus 100. In addition, the memory 120 may store a Virtual Machine (VM) 131 and a hypervisor 132 that manages the operations of the VM 131. The VM 131 means a virtual space in which a computing environment is implemented as software, and an application and a guest operating system are installed on the VM 131. The VM 131 may include an application to be executed based on a resource that is controlled or provided under the control of the guest operating system and a library used for execution of the application. The hypervisor 132 is placed on top of the host operating system, and refers to software that controls resources, etc. provided to the VM 131 so that the guest operating system which is a separate operating system on the VM 131 can be executed. Meanwhile, the memory 120 may include a volatile memory 121 and a non-volatile memory 122. For example, the non-volatile memory 122 may be implemented as a hard disk or a flash memory.

Meanwhile, in FIG. 2, the VM 131 and the hypervisor 132 are illustrated as components of the processor 130. However, this is to explain that the processor 130 controls the overall operations of the electronic apparatus 100 using the VM 131 and the hypervisor 132, and the VM 131 and the hypervisor 132 are not necessarily limited to the components of the processor 130.

The processor 130 may control the overall operations of the electronic apparatus 100. In particular, the processor 130 may control the overall operations of the electronic apparatus 100 using the hypervisor 132 stored in the memory 120. For example, in order for the electronic apparatus 100 to provide a service corresponding to an application in the VM 131, an authentication key for performing authentication of an external device may be used. Specifically, when the electronic apparatus 100 provides location information of an IoT device to an external device, the electronic apparatus 100 should provide the location information to the external device which is authenticated based on the authentication key in order to prevent the location information from leaking to the outside. In addition, even if the location information is leaked due to an attack from a hacker, etc. in the process of being transmitted from the electronic apparatus 100 to the external device, the location information is encrypted so that the hacker cannot use the location information. In such circumstances, the authentication key may be used to encrypt the location information.

Meanwhile, the processor 130 may user the hypervisor 132 to prevent security accidents and safely manage and store the authentication key. The processor 130 may obtain the authentication key using the hypervisor 132, and encrypt and store the obtained authentication key in the non-volatile memory 122. For example, the hypervisor 132 may load the authentication key onto the volatile memory 121 and perform an encryption operation regarding the authentication key. Subsequently, the hypervisor 132 may store the encrypted authentication key in the non-volatile memory 122. As such, when the operation of managing the authentication key is performed at the level of the hypervisor 132, the VM 131 which operates at a level lower than the level of the hypervisor 132 cannot access the memory 120. For example, the VM 131 cannot access the non-volatile memory 122 where the authentication is stored. Accordingly, even though the VM 131 is exposed to an external attack, the authentication key can be protected safely.

Various functions related to the authentication key may be performed through a Trusted Platform Module (TPM) 140. The TPM 140 may include an authentication key acquisition unit 141, an authentication key encryption unit 142, an authentication key storage unit 143, an authentication key decryption unit 144, a user authentication unit 145, an information acquisition unit 146, and an information encryption unit 147.

The authentication key acquisition unit 141 may obtain an authentication key. For example, when the electronic apparatus 100 is connected to an external device through the communication interface 110, the authentication key acquisition unit 141 may obtain an authentication key for performing authentication of the external device. In this case, the authentication key may be a symmetric key or a non-symmetric key. If the authentication key is a symmetric key, the authentication key acquisition unit 141 may generate an authentication key (e.g., a secret key), and transmit the generated authentication key to the external device through the communication interface 110. Alternatively, the authentication key acquisition unit 141 may receive an authentication key generated by the external device through the communication interface 110. If the authentication key is a non-symmetric key, the authentication key acquisition unit 141 may generate a private key and a public key that correspond to each other. Subsequently, the authentication key acquisition unit 141 may transmit the public key to the external device through the communication interface 110. The authentication key acquisition unit 141 may receive a public key generated by the external device.

When the authentication key is obtained, the authentication key encryption unit 142 may encrypt the authentication key using a pre-stored key. Here, the pre-stored key refers to a unique key regarding the electronic apparatus 100, which was determined at the step of manufacturing the electronic apparatus 100, and may be stored in a System on Chip (SoC) included in the electronic apparatus 100. Accordingly, the VM 131 cannot access the pre-stored key.

When the authentication key is encrypted by the authentication key encryption unit 142, the authentication key storage unit 143 may store the encrypted authentication key in the non-volatile memory 122. As the authentication key encryption unit 142 operates at the level of the hypervisor 132, the VM 131 or a guest OS included in the VM 131 cannot access the non-volatile memory 122. Accordingly, the encrypted authentication key can be stored in the non-volatile memory 122 safely.

The authentication key decryption unit 144 may decrypt the encrypted authentication key and obtain the authentication key. Specifically, the authentication key decryption unit 144 may load the stored encrypted authentication key onto the volatile memory 121, and perform a decryption operation to obtain the authentication key.

When a request for information stored in the electronic apparatus 100 is received from an external device, the user authentication unit 145 may perform authentication of the external device using the authentication key obtained by the authentication key decryption unit 144. For example, the external device may encrypt a message requesting information stored in the electronic apparatus 100, and transmit the encrypted message to the electronic apparatus 100. The user authentication unit 145 may perform a decryption operation regarding the encrypted message using the authentication key. In this case, when the decryption is successfully performed, authentication of the external device is completed. On the other hand, when the decryption is failed, authentication of the external device is also failed.

If the authentication key is a symmetric key, the user authentication unit 145 may perform authentication of the external device using a first symmetric key (e.g., a secret key). Here, the first symmetric key is obtained through the authentication key acquisition unit 141, and the external device encrypts a message based on the first symmetric key. Accordingly, when the message is decrypted based on the first symmetric key, the user authentication unit 145 may determine that authentication of the external device is successfully performed (or completed).

If the authentication key is a non-symmetric key, the user authentication unit 145 may perform authentication of the external device based on a first public key (e.g., M. public key) received from the external device. Here, the first public key is generated by the external device, and corresponds to a first private key (e.g., M. private key) used by the external device to encrypt a message. The message encrypted by the external device using the first private key may be decrypted with the first public key. Accordingly, when the message encrypted based on the first public key is decrypted, the user authentication unit 145 may determine that authentication of the external device is successfully performed (or completed).

The information acquisition unit 146 may obtain information related to the electronic apparatus 100. Here, the information related to the electronic apparatus 100 may include information obtained through a component (e.g., a sensor) of the electronic apparatus 100. For example, if the electronic apparatus 100 is an IoT tracker device, information related to the electronic apparatus 100 may mean location information of an external IoT device that is obtained through a GPS sensor provided in the electronic apparatus 100. In addition, information related to the electronic apparatus 100 may include information regarding control rights of the electronic apparatus 100. For example, if the electronic apparatus 100 is a smart boiler, information related to the electronic apparatus 100 may mean a command regarding temperature control of the electronic apparatus 100.

When authentication of the external device is completed, the information acquisition unit 146 may control the communication interface 110 to transmit the information related to the electronic apparatus 100 to the external device. Meanwhile, information related to the electronic apparatus 100 may be encrypted and transmitted to the external device. To this end, the information encryption unit 147 may perform an encryption operation regarding the information related to the electronic apparatus 100 using the authentication key. Specifically, the information encryption unit 147 may load the information related to the electronic apparatus 100 onto the volatile memory 121, and encrypt the information related to the electronic apparatus 100 using the authentication key. The information related to the electronic apparatus 100 is transmitted in an encrypted state by the information encryption unit 147 and thus, even if the information is stolen by an external attack, the attacker cannot use the encrypted information. Accordingly, it is possible to prevent the information related to the electronic apparatus 100 from being leaked to the outside.

Meanwhile, if the authentication key is a symmetric key, the information encryption unit 147 may encrypt the information related to the electronic apparatus 100 using the first symmetric key, and the external device may decrypt the information related to the electronic apparatus 100 based on the first symmetric key. The external device may determine whether the information related to the electronic apparatus 100 is authentic based on whether the decryption is successful. In other words, if the decryption is successfully performed, the external device may confirm that the information related to the electronic apparatus 100 has not been altered.

If the authentication key is a non-symmetric key, the information encryption unit 147 may encrypt the information related to the electronic apparatus 100 using a second private key (e.g., I. private key) generated by the authentication key acquisition unit 141. In this case, the external device may decrypt the encrypted information using a second public key (e.g., I. public key) generated by the authentication key acquisition unit 141. When the encrypted information is successfully decrypted using the second public key, the external device may verify that the encrypted information is information provided from the electronic apparatus 100.

Meanwhile, in FIG. 2, the TPM 140 is illustrated as a component of the processor 130, but this is an example. The TPM 140 may be stored in the non-volatile memory 122. In this case, the processor 130 may load the TPM stored in the non-volatile memory 122 onto the volatile memory 121 to perform functions corresponding to the TPM 140. In addition, the components of the processor 130 may be implemented as software, or may be implemented as a combination of software and hardware.

Figure 3:
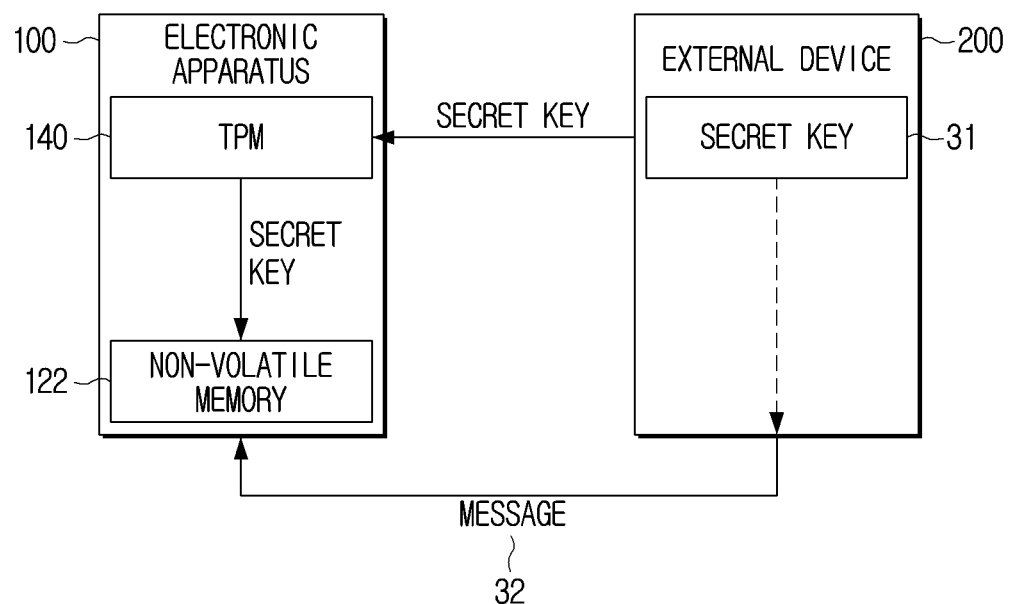
FIG. 3 illustrates a view provided to explain an operation of an electronic apparatus when an authentication key is a symmetric key.

FIG. 3 illustrates a view provided to explain an operation of an electronic apparatus according to an embodiment. Specifically, FIG. 3 is a view provided to explain an operation of an electronic apparatus when an authentication key is a symmetric key.

The electronic apparatus 100 may obtain an secret key 31 from an external device 200. For example, when the electronic apparatus 100 is paired with the external device 200, the external device 200 may generate the secret key 31 and transmit the secret key 31 to the electronic apparatus 100. However, this is an example, and the secret key 31 may be generated by the electronic apparatus 100 and transmitted to the external device 200. For example, the electronic apparatus 100 may be an IoT tracker device, and the external device 200 may be a smart phone.

When the secret key 31 is obtained, the electronic apparatus 100 may encrypt the secret key 31 using the TPM 140 and store the encrypted authentication key in the non-volatile memory 122. Meanwhile, the electronic apparatus 100 may receive a message 32 from the external device 200. In this case, the message 32 may be a message requesting an access to information stored in the electronic apparatus 100 or information obtained through the electronic apparatus 100. For example, the message 32 may be a message requesting location information of other IoT devices obtained by the electronic apparatus 100.

Meanwhile, the message 32 may be encrypted (or signed) by the external device 200 and transmitted to the electronic apparatus 100. The electronic apparatus 100 may perform a decryption operation regarding the message 32 using the secret key 31 stored in the non-volatile memory 122. When the message 32 is decrypted successfully, the electronic apparatus 100 may determine that the external device 200 is a pre-registered device. In addition, the electronic apparatus 100 may transmit information requested by the external device 200 to the external device 200. In this case, in order to prevent the information from leaking to the outside during the transmission process, the electronic apparatus 100 may encrypt the information requested by the external device 200 using the secret key 31, and transmit the encrypted information to the external device 200. On the other hand, if the message 32 is not decrypted successfully, the electronic apparatus 100 may determine that the external device 200 is not a pre-registered external device 200. Accordingly, the electronic apparatus 100 may not transmit the information to the external device 200.

Figure 4:
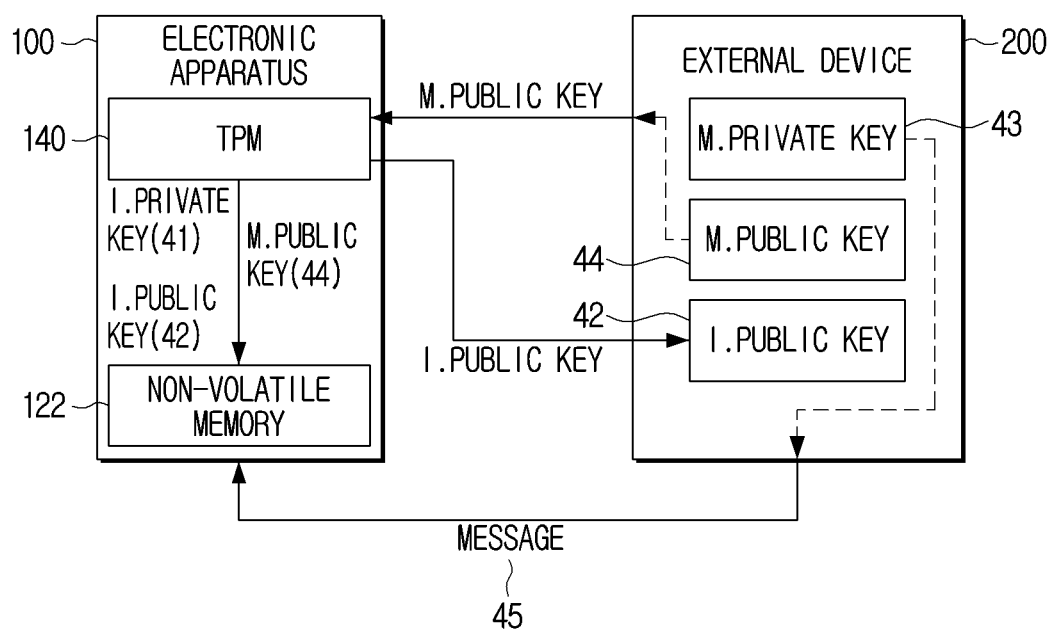
FIG. 4 illustrates a view provided to explain an operation of an electronic apparatus when an authentication key is a non-symmetric key.

FIG. 4 illustrates a view provided to explain an operation of an electronic apparatus according to another embodiment. Specifically, FIG. 4 is a view provided to explain an operation of an electronic apparatus when an authentication key is a non-symmetric key. The electronic apparatus 100 and the external device 200 may generate an authentication key, respectively. For example, the electronic apparatus 100 may generate a first private key 41 and a first public key 42 that correspond to each other, and the external device 200 may generate a second private key 43 and a second public key 44 that correspond to each other. The electronic apparatus 100 may transmit the first public key 42 to the external device 200 and receive the second public key 44. The external device 200 may transmit the second public key 44 to the electronic apparatus 100 and receive the first public key 42. Accordingly, the electronic apparatus 100 and the external device 200 may share the first public key 42 and the second public key 44 with each other.

When the authentication keys are obtained, the electronic apparatus 100 may encrypt the obtained authentication keys using the TPM 140 and store the authentication keys in the non-volatile memory 122. In other words, the electronic apparatus 100 may encrypt the first private key 41, the first public key 42 and the second public key 44, respectively, and store the encrypted keys in the non-volatile memory 122. In addition, the electronic apparatus 100 may receive a message 45 requesting information related to the electronic apparatus 100 from the external device 200. In this case, the message 45 may be encrypted by the external device 200 based on the second private key 43 and transmitted to the external device 200.

When the message 45 is obtained, the electronic apparatus 100 may perform a decryption operation regarding the message 45 using the second public key 44 corresponding to the second private key 43. When the message 45 is successfully decrypted, the electronic apparatus 100 may determine that the external device 200 is a pre-registered device. In addition, the electronic apparatus 100 may transmit information related to the electronic apparatus 100 to the external device 200. In this case, in order to prevent the information from leaking to the outside in the transmission process, the electronic apparatus 100 may encrypt the information related to the electronic apparatus 100 using the first private key 41 and transmit the encrypted information to the external device 200. The external device 200 may receive the encrypted information from the electronic apparatus 100, and decrypt the encrypted information using the first public key 42 corresponding to the first private key 41. Meanwhile, if the message 45 is not successfully decrypted, the electronic apparatus 100 may determine that the external device 200 is not the pre-registered external device 200. Accordingly, the electronic apparatus 100 may not transmit the information to the external device 200.

Figure 5:
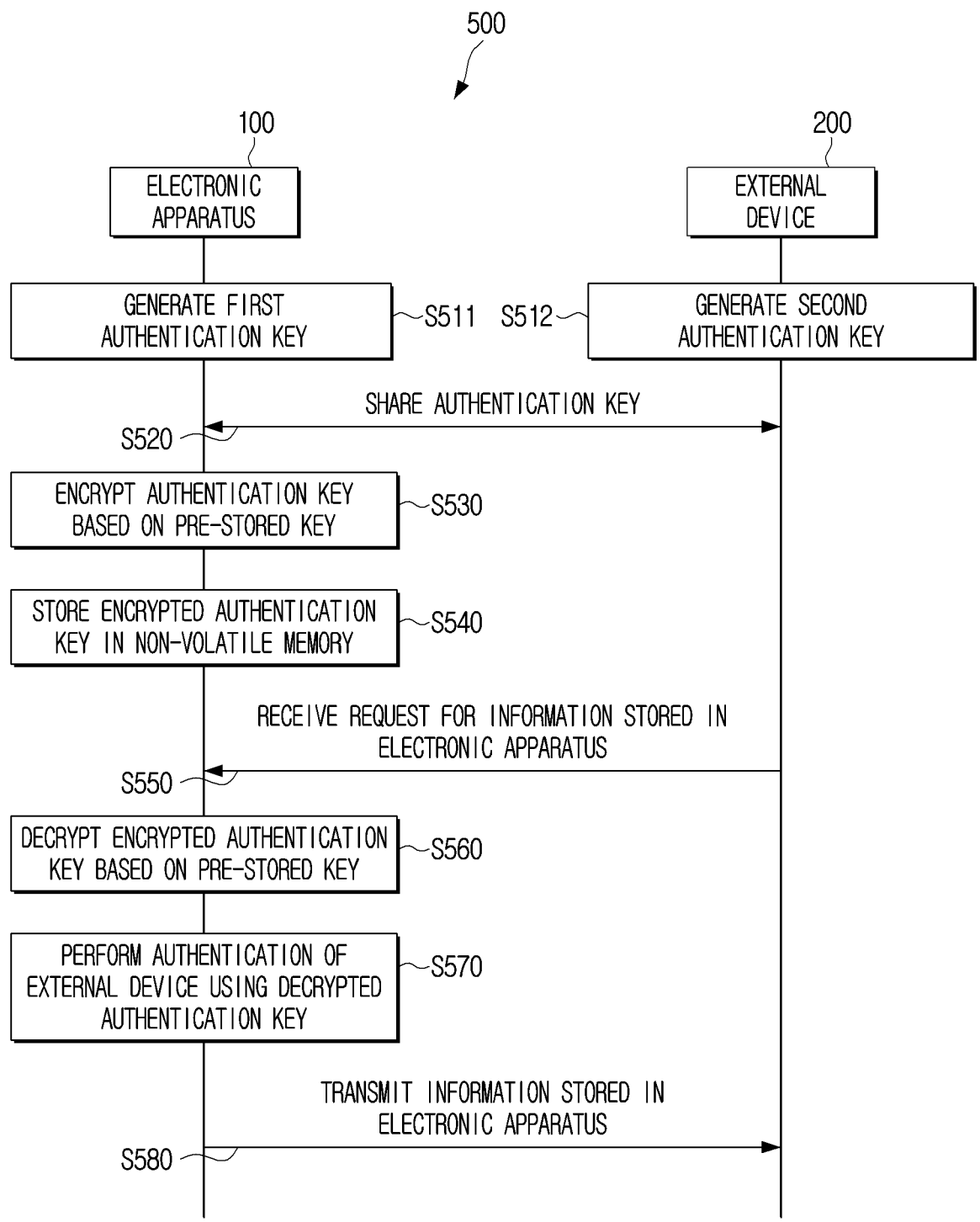
FIG. 5 illustrates a sequence view of an authentication key management system according to an embodiment.

FIG. 5 illustrates a sequence view of an authentication key management system according to an embodiment. An authentication key management system 500 may include the electronic apparatus 100 and the external device 200. The electronic apparatus 100 may generate a first authentication key (S511), and the external device 200 may generate a second authentication key (S512). The electronic apparatus 100 and the external device 200 may share the generated authentication keys (S520). If the authentication key is a non-symmetric key, the authentication key includes a private key and a public key, and the electronic apparatus 100 and the external device 200 may share the public key. Meanwhile, if the authentication key is a symmetric key, the authentication key may be generated by one of the electronic apparatus 100 or the external device 200, and the step of S511 or the step of S512 may be omitted.

The electronic apparatus 100 may encrypt the authentication key based on a pre-stored key, and store the encrypted authentication key in a non-volatile memory (S540). The pre-stored key may be stored in a SoC included in the electronic apparatus 100. The authentication key may include the above-described first authentication key and second authentication key.

The electronic apparatus 100 may receive a request for information stored in the electronic apparatus 100 (S550). Subsequently, the electronic apparatus 100 may decrypt the encrypted authentication key based on the pre-stored key (S560), and perform authentication of an external device using the decrypted authentication key (S570). When authentication of the external device 200 is completed, the electronic apparatus 100 may transmit the information stored in the electronic apparatus 100 to the external device 200 (S580). The method of performing authentication of an external device has been described with reference to FIGS. 3 and 4 and thus, further description will not be provided.

Figure 6:
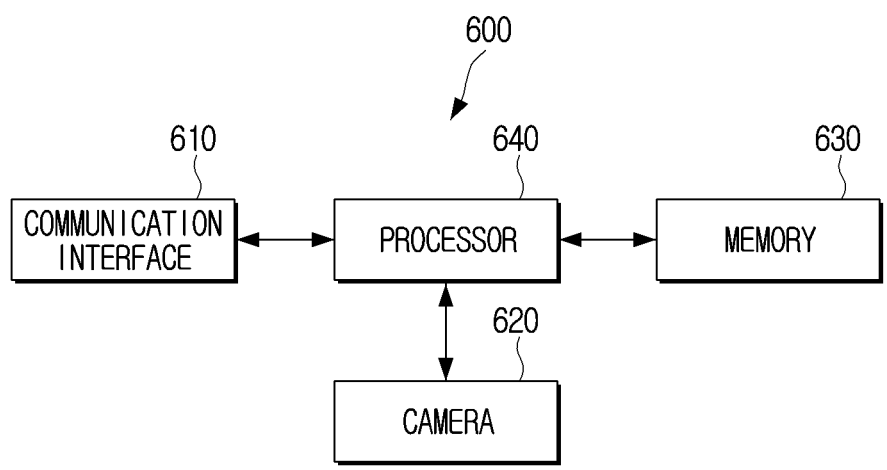
FIG. 6 illustrates a block diagram of configuration of an electronic apparatus according to an embodiment.

FIG. 6 illustrates a block diagram of configuration of an electronic apparatus according to an embodiment. An electronic apparatus 600 may include a communication interface 610, a camera 620, a memory 630, and a processor 640.

The communication interface 610 may receive an authentication key for performing authentication of an external device from the external device. The communication interface 610 may perform data communication wirelessly or with wire. When communication is performed with an external device through a wireless communication method, the communication interface 610 may include at least one of a WiFi communication module, a cellular communication module, a 3G mobile communication module, a 4G mobile communication module, a 4G Long Term Evolution (LTE) communication module, or a 5G mobile communication module. Meanwhile, according to an embodiment, the communication interface 610 may be implemented as a wireless communication module, but this is an example. The communication interface 610 may be implemented as a wired communication module (e.g., a LAN, etc.).

The camera 620 is configured to obtain an image capturing surroundings of an electronic apparatus 600. The camera 620 may be implemented as an image sensor such as a Complementary Metal-Oxide-Semiconductor (CMOS), a Charge-Coupled Device (CCD), etc. Alternatively, the camera 620 may be implemented as an infrared sensor.

The memory 630 is configured to store an Operating System (OS) for controlling the overall operations of the components of the electronic apparatus 600 and commands or data related to the components of the electronic apparatus 600. To this end, the memory 630 may be implemented as a non-volatile memory (e.g., a hard disk, a Solid State Drive (SSD), a flash memory), a volatile memory, etc. The memory 630 according to an embodiment may store an authentication key obtained through the communication interface 610. In addition, the memory 630 may store an image obtained through the camera 620.

The processor 640 may control the overall operations of the electronic apparatus 600.

For example, the processor 640 may obtain an authentication key for performing authentication of an external device through the communication interface 610. The processor 640 may encrypt the authentication key based on a key pre-stored in the memory 630 using a hypervisor stored in the memory 630. The processor 640 may store the encrypted authentication key in the memory 630.

When a request for information stored in the memory 630 is received from an external device, the processor 640 may perform authentication of the external device using a hypervisor. Here, the information stored in the memory 630 may include location information of an IoT device related to the electronic apparatus 600. The processor 640 may decrypt the encrypted authentication key based on the pre-stored key using the hypervisor. In addition, the processor 640 may perform authentication of the external device using the decrypted authentication key. For example, if a message including a request for information stored in the memory 630 is obtained form an external device, the processor 640 may perform decryption of the message using the hypervisor.

The processor 640 may determine whether the external device is a pre-registered device based on a result of the decryption. For example, if the message is successfully decrypted, the processor 640 may determine that the external device is a pre-registered device. On the other hand, if the message is not successfully decrypted, the processor 640 may determine that the external device is not a pre-registered device.

Meanwhile, the authentication key may include a private key and a public key that correspond to each other. If a message encrypted by an external device based on the private key is obtained, the processor 640 may decrypt the encrypted message based on the public key using the hypervisor. When authentication of the external device is completed, that is, when it is determined that the external device is a pre-registered device, the processor 640 may control the communication interface 610 to transmit the information stored in the memory 630 to the external device.

FIG. 7 illustrates a flowchart of a controlling method of an electronic apparatus.

The electronic apparatus 100 may obtain an authentication key for performing authentication of an external device (S710). For example, when an external device is connected, the electronic apparatus 100 may obtain an authentication key for performing authentication of the external device. In this case, the authentication key may be a symmetric key or a non-symmetric key. If the authentication key is a symmetric key, the electronic apparatus 100 may generate an authentication key (e.g., a secret key) and transmit the generated authentication key to the external device. Alternatively, the electronic apparatus 100 may receive an authentication key generated by the external device from the external device. If the authentication key is a non-symmetric key, the authentication key may generate a private key and a public key that correspond to each other. In this case, the private key may be used to encrypt information stored in the electronic apparatus 100, and the public key may be used for authentication of the electronic apparatus 100 by the external device.

The electronic apparatus 100 may encrypt the authentication key based on a key pre-stored in the memory using a hypervisor and store the encrypted authentication key in the memory (S720). In particular, the electronic apparatus 100 may store the authentication key encrypted using the hypervisor in a non-volatile memory such as a flash memory and a hard disk. Accordingly, the encrypted authentication key may be stored safely without being exposed to a virtual machine.

When a request for information stored in the memory is received from the external device, the electronic apparatus 100 may decrypt the encrypted authentication key based on the pre-stored key using the hypervisor and perform authentication of the external device using the decrypted authentication key (S730). For example, when a message including a request for information stored in the electronic apparatus 100 is obtained from the external device, the electronic apparatus 100 may perform decryption of the obtained message using the hypervisor. If the message is successfully decrypted, the electronic apparatus 100 may determine that the external device is a pre-registered device. On the other hand, if the message is not successfully decrypted, the electronic apparatus 100 may determine that the external device is not a pre-registered device.

When authentication of the external device is completed, the electronic apparatus 100 may encrypt the stored information based on the decrypted authentication key using the hypervisor (S740). Subsequently, the electronic apparatus 100 may transmit the encrypted information to the external device through the communication interface (S750).

Meanwhile, the diverse embodiments described above may be implemented in a recording medium that can be read by a computer or an apparatus similar to the computer using software, hardware, or a combination of software and hardware. In some cases, embodiments described in the disclosure may be implemented by a processor itself. According to a software implementation, embodiments such as procedures and functions described in the specification may be implemented by separate software modules. Each of the software modules may perform one or more functions and operations described in the disclosure.

Meanwhile, computer instructions for performing processing operations according to the diverse embodiments of the disclosure described above may be stored in a non-transitory computer-readable medium. The computer instructions stored in the non-transitory computer-readable medium cause a specific device to perform the processing operations of the display apparatus according to the diverse embodiments described above when they are executed by a processor of the specific device The non-transitory computer-readable medium is not a medium that stores data for a while, such as a register, a cache, a memory, or the like, but means a medium that semi-permanently stores data and is readable by the device. Specific examples of the non-transitory computer-readable medium may include a compact disk (CD), a digital versatile disk (DVD), a hard disk, a Blu-ray disk, a USB, a memory card, a ROM, and the like.

Meanwhile, the machine-readable storage medium may be provided in a form of a non-transitory storage medium. Here, the 'non-transitory storage medium' is a tangible device and may indicate that the device does not include a signal (e.g., electromagnetic wave). This term does not distinguish whether data are semi-permanently or temporarily stored in the storage medium. For example, the 'non-transitory storage medium' may include a buffer in which data is temporarily stored According to an embodiment, the methods according to the various embodiments disclosed in the disclosure may be included and provided in a computer program product. The computer program product may be traded as a product between a seller and a purchaser. The computer program product may be distributed in a form of the machine-readable storage medium (for example, a compact disc read only memory (CD-ROM)) that may be read by the machine, or distributed online (e.g. download or upload) through an application store (for example, PLAYSTORE) or directly between two user devices (e.g., smartphones). In the case of the online distribution, at least portions of the computer program products (e.g., downloadable app) may be at least temporarily stored or generated in the machine-readable storage medium such as a memory of a server of a manufacturer, a server of an application store or a relay server.

While preferred embodiments of the disclosure have been shown and described, the disclosure is not limited to the aforementioned specific embodiments, and it is apparent that various modifications can be made by those having ordinary skill in the art to which the disclosure belongs, without departing from the gist of the disclosure as claimed by the appended claims, and such modifications are not to be interpreted independently from the technical idea or prospect of the disclosure.

Although the present disclosure has been described with various embodiments, various changes and modifications may be suggested to one skilled in the art. It is intended that the present disclosure encompass such changes and modifications as fall within the scope of the appended claims.

100: electronic apparatus
110: communication interface
120: memory
130: processor
200: external device
500: authentication key management system

What is claimed is:

1. An electronic apparatus comprising:
a communication interface;
a memory configured to store a hypervisor; and
a processor, wherein the processor is configured to:
   obtain an authentication key for performing authentication of an external device;
   encrypt the authentication key based on a key that is pre-stored in the memory using the hypervisor and store the encrypted authentication key in the memory;
   based on a request for information that is stored in the memory being received from the external device, perform authentication of the external device using the hypervisor; and
   based on the authentication of the external device being completed, control the communication interface to transmit the stored information to the external device.

2. The electronic apparatus as claimed in claim 1, wherein the processor is further configured to:
   decrypt the encrypted authentication key based on the pre-stored key using the hypervisor; and
   perform authentication of the external device using the decrypted authentication key.

3. The electronic apparatus as claimed in claim 1, wherein the processor is further configured to:
   based on a message including the request being obtained, perform decryption of the message using the hypervisor; and
   determine whether the external device is a pre-registered device based on a result of the decryption.

4. The electronic apparatus as claimed in claim 3, wherein the processor is further configured to:
   based on the message being successfully decrypted, determine that the external device is the pre-registered device; and
   based on the message not being successfully decrypted, determine that the external device is not the pre-registered device.

5. The electronic apparatus as claimed in claim 1, wherein the processor is further configured to:
   encrypt the stored information based on a decrypted authentication key using the hypervisor; and
   based on the authentication of the external device being completed, control the communication interface to transmit the encrypted information to the external device.

6. The electronic apparatus as claimed in claim 1, wherein:
   the authentication key includes a private key and a public key that correspond to each other, and
   based on a message encrypted by the external device based on the private key being received, decrypt the encrypted message based on the public key using the hypervisor.

7. The electronic apparatus as claimed in claim 1, wherein the information stored in the memory includes location information of an IoT device related to the electronic apparatus.

8. A controlling method of an electronic apparatus, comprising:
obtaining an authentication key for performing authentication of an external device;
encrypting the authentication key based on a key pre-stored in a memory using a hypervisor and store the encrypted authentication key;
based on a request for information that is stored in the memory being received from the external device, performing authentication of the external device using the hypervisor; and
based on the authentication of the external device being completed, transmitting the stored information to the external device.

9. The method as claimed in claim 8, wherein the performing authentication of the external device comprises:
decrypting the encrypted authentication key based on the pre-stored key using the hypervisor; and
performing authentication of the external device using the decrypted authentication key.

10. The method as claimed in claim 8, wherein the performing authentication of the external device comprises:
based on a message including the request being obtained, performing decryption of the message using the hypervisor; and
determining whether the external device is a pre-registered device based on a result of the decryption.

11. The method as claimed in claim 10, wherein the performing authentication of the external device comprises:
based on the message being successfully decrypted, determining that the external device is the pre-registered device; and
based on the message not being successfully decrypted, determining that the external device is not the pre-registered device.

12. The method as claimed in claim 8, wherein the transmitting the stored information to the external device comprises:
encrypting the stored information based on a decrypted authentication key using the hypervisor; and
based on the authentication of the external device being completed, transmitting the encrypted information to the external device.

13. The method as claimed in claim 8, wherein:
the authentication key includes a private key and a public key that correspond to each other, and
the performing authentication of the external device comprises, based on a message encrypted by the external device based on the private key being received, decrypting the encrypted message based on the public key using the hypervisor.

14. The method as claimed in claim 8, wherein the information stored in the memory includes location information of an IoT device related to the electronic apparatus.

15. A non-transitory computer readable medium containing instructions that when executed cause a processor of an electronic device to:
obtain an authentication key for performing authentication of an external device;
encrypt the authentication key based on a key pre-stored in a memory using a hypervisor and store the encrypted authentication key;
based on a request for information that is stored in the memory being received from the external device, perform authentication of the external device using the hypervisor; and
based on the authentication of the external device being completed, transmit the stored information to the external device.

16. The non-transitory computer readable medium of claim 15, wherein the instructions that when executed cause the processor to perform authentication of the external device, comprise instructions that when executed cause the processor to:
decrypt the encrypted authentication key based on the pre-stored key using the hypervisor; and
perform authentication of the external device using the decrypted authentication key.

17. The non-transitory computer readable medium of claim 15, wherein the instructions that when executed cause the processor to perform authentication of the external device, comprise instructions that when executed cause the processor to:
based on a message including the request being obtained, perform decryption of the message using the hypervisor; and
determine whether the external device is a pre-registered device based on a result of the decryption.

18. The non-transitory computer readable medium of claim 17, wherein the instructions that when executed cause the processor to perform authentication of the external device, comprise instructions that when executed cause the processor to:
based on the message being successfully decrypted, determine that the external device is the pre-registered device; and
based on the message not being successfully decrypted, determine that the external device is not the pre-registered device.

19. The non-transitory computer readable medium of claim 15, wherein the instructions that when executed cause the processor to transmit the stored information to the external device, comprise instructions that when executed cause the processor to:
encrypt the stored information based on a decrypted authentication key using the hypervisor; and
based on the authentication of the external device being completed, transmit the encrypted information to the external device.

20. The non-transitory computer readable medium of claim 15, wherein:
the authentication key includes a private key and a public key that correspond to each other, and
the instructions that when executed cause the processor to perform authentication of the external device, comprise instructions that when executed cause the processor to based on a message encrypted by the external device based on the private key being received, decrypt the encrypted message based on the public key using the hypervisor.

21. The non-transitory computer readable medium of claim 15, wherein the information stored in the memory includes location information of an IoT device related to the electronic device.

* * * * *